Jan. 2, 1951  G. ÖSTERGREN  2,536,565
SERVOMOTOR
Filed Jan. 21, 1947
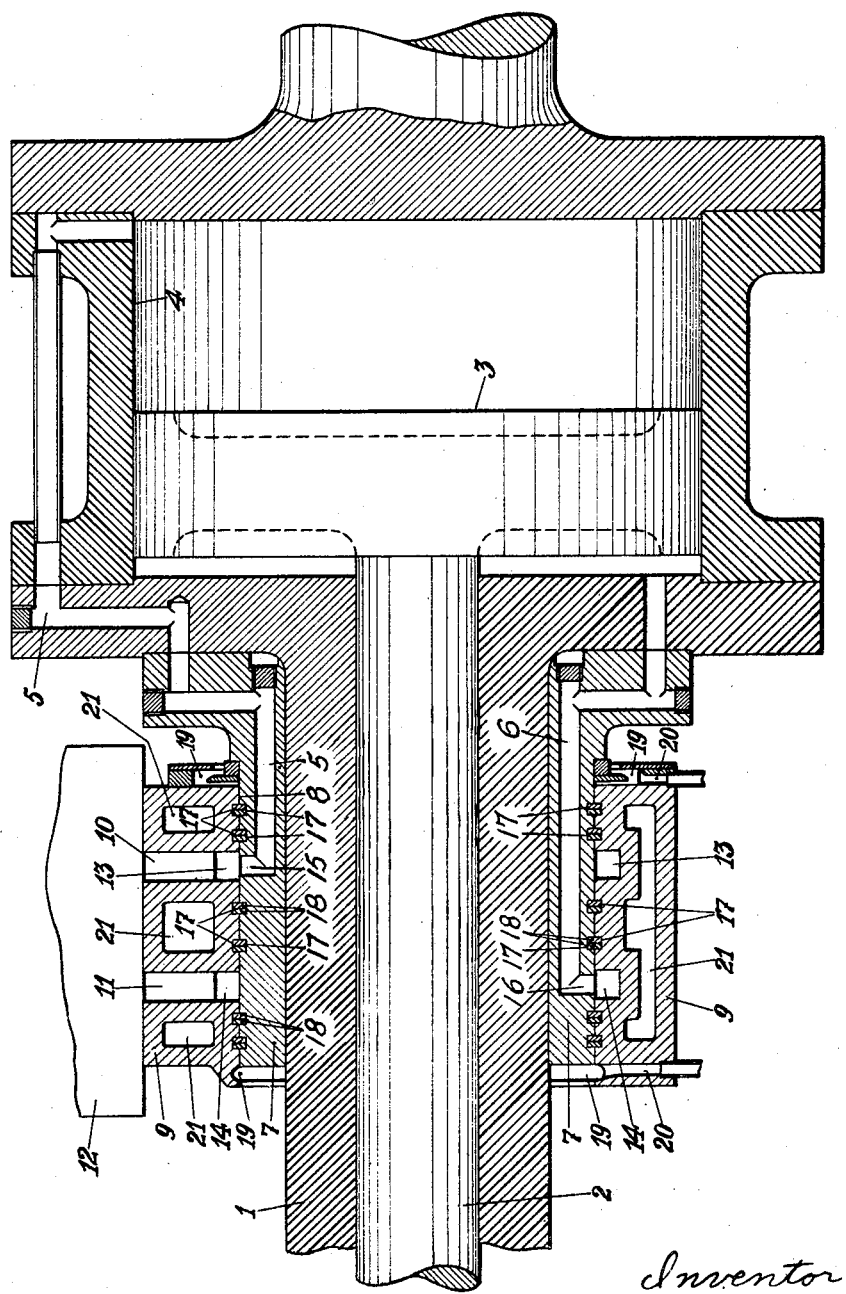
Inventor
Gustaf Östergren
by Sommers & Young
Attorneys Patented Jan. 2, 1951

2,536,565

UNITED STATES PATENT OFFICE 2,536,565

SERVOMOTOR

Gustaf Östergren, Jonkoping, Sweden, assignor to Aktiebolaget Jonkopings Motorfabrik, Jonkoping, Sweden, a Swedish joint-stock company Application January 21, 1947, Serial No. 723,253
In Sweden February 8, 1945

Section 1, Public Law 690, August 8, 1946
Patent expires February 8, 1965

3 Claims. (Cl. 121—38)

This invention relates to a servo-motor and more particularly to a reciprocating hydraulic servo-motor for actuating the blades of a propeller.

One object of the invention is to arrange the means for admission of the pressure liquid to the cylinder of the servo-motor, so that the shaft of the propeller is not weakened by any passages. Another object of the invention is to provide an efficient sealing device for the pressure liquid channel when passing from a fixed governing device to the rotatable system.

In the accompanying drawing is illustrated in longitudinal section an embodiment of the invention.

The shaft 1 has a longitudinally displaceable rod 2 guided coaxially in the shaft and acting for instance on the blades of an adjustable propeller mounted on the end of the shaft. The rod 2 is connected to the piston 3 of a servo-motor, which is slidably guided in a cylinder 4 coaxially mounted on the shaft and rotating with the same. In order not to weaken the shaft 1 and to facilitate the boring of pressure fluid channels 5 and 6, rotating with the shaft and leading to both ends of the cylinder 4, these channels are along the greatest part of their length arranged within a bushing 7 fastened around the shaft and having an outer cylindrical surface 8 rotating in a corresponding cylindrical surface of a sleeve 9 enclosing the bushing 7. The sleeve contains two fixed channels 10 and 11 the outer ends of which communicate with corresponding orifices in a governing device 12 for the regulation of the admission of pressure fluid to the servo-motor, and the inner ends of which open into annular connection chambers 13 and 14 formed into the cylindrical surface of the sleeve 9. The channels 5 and 6 within the bushing 7 communicate also with the chambers 13 and 14 through borings 15 and 16 in the bushing.

Between the connection chambers 13 and 14 and between these and on the outer side thereof the bushing 7 and the sleeve 9 are provided with annular grooves 17 opposite to each other, said grooves forming pairs of closed annular channels of essentially square cross section in each one of the axial sections separated from each other by the connection chambers. In each of said annular channels are inserted two sealing rings having a radial thickness corresponding to the sum of the depths of the opposite grooves and the total breadth of which in axial direction is equal to the width of the grooves. Thus the sealing rings fill entirely the annular channels 17 and prevent any pressure fluid to leak out along the cylindrical surfaces. The sealing rings 18 are made of a hard material resistant to wearing and are preferably formed like ordinary piston rings, which are pushed over the bushing 7, whereafter the sleeve 9, which is made of two connected halves, is mounted around the bushing 7. The sealing rings are preferably dimensioned so as to exert a feeble pressure against the bottom of the grooves made in the bushing 7, whereby they are kept in position relatively to the rotating parts. Depending on the pressure to be used in the fluid or liquid channels and on the desired sealing effect an appropriate number of sealing grooves and of rings placed therein may be used. If the pressure fluid is oil, which is preferred in most devices of this kind, a feeble oil leakage through the grooves may be allowed for the lubrication of the cylindrical surfaces. Devices for collecting this leaking oil, as collecting grooves 19 and channels 20, are preferably disposed at the end of the bushing 7 and the sleeve 9.

By the use of a bushing 7 with channels and grooves the shaft 1 within this bushing is not weakened, but it is obvious that the bushing may be dispensed with, if the shaft is provided with a corresponding enlargement. Within the sleeve 9 are preferably provided excavations or channels 21 for a cooling liquid, and said channels may be connected to the cooling system of the motor, by which the shaft is driven.

When using two sealing rings in each pair of grooves, the one ring will cover and seal the slot which is formed between the free ends of the other ring. One of the rings may be adapted to lie pressed against the bottom of the groove in the sleeve 9, while the other ring may press against the bottom of the groove in the bushing 7. As the two rings also are pressed against each other by the fluid pressure, they therefore ensure an effective sealing against leakage.

What I claim is:

1. A reciprocating hydraulic servo-motor for the blades of a propeller mounted on a shaft having a central bore, comprising a slidable rod located in the central bore of the propeller shaft, a servo-motor cylinder mounted on said shaft, one end of said rod being connected with a hydraulically operated piston in said cylinder, a bushing mounted fixedly on said shaft, a nonrotatably mounted sleeve surrounding said bushing, each end of said cylinder being connected by means of a channel with a governing device for regulation of the admission of a pressure fluid to the cylinder ends, each channel passing from the respective end of the cylinder through said bushing entirely outside said shaft and to said governing device over an inter-connected channel forming an annular groove in the slide-face between said bushing and said sleeve, at least on one side of said connection groove a pair of opposite annular sealing grooves recessed in said slide-face, and at least one split sealing ring being freely rotatable in said pair of sealing grooves adapted to seal against leakage from said connection channel along said slide-face.

2. A reciprocating hydraulic servo-motor for the blades of a propeller mounted on a shaft having a central bore, comprising a slidable rod located on the central bore of the propeller shaft, a servo-motor cylinder mounted on said shaft, one end of said rod being connected with a hydraulically operated piston in said cylinder, a bushing mounted fixedly on said shaft, a non-rotatably mounted sleeve surrounding said bushing, each end of said cylinder being connected by means of a channel with a governing device for regulation of the admission of a pressure fluid to the cylinder ends, each channel passing from the respective end of the cylinder through said bushing entirely outside said shaft and to said governing device over an inter-connected channel forming an annular groove in the slide-face between said bushing and said sleeve, at least on one side of said connection groove a pair of opposite annular sealing grooves with rectangular cross section recessed in said slide-face, and at least two freely rotatable and split sealing rings of rectangular cross section arranged side by side in said pair of sealing grooves, at least one of said sealing rings pressing against the inner surface of said sealing groove and at least one of said sealing rings pressing against the outer surface of said sealing grooves.

3. A reciprocating hydraulic servo-motor for the blades of a propeller mounted on a shaft having a central bore, comprising a slidable rod located in the central bore of the propeller shaft, a servo-motor cylinder mounted on said shaft, one end of said rod being connected with a hydraulically operated piston in said cylinder, a bushing mounted fixedly on said shaft, a non-rotatably mounted but in axial direction adjustable sleeve surrounding said bushing, each end of said cylinder being connected by means of a channel with a governing device for regulation of the admission of a pressure fluid to the cylinder ends, each channel passing from the respective end of the cylinder through said bushing entirely outside said shaft and to said governing device over an inter-connected channel forming an annular groove in the slide-face between said bushing and said sleeve, at least on one side of said connection groove a pair of opposite annular sealing grooves recessed in said slide-face, and at least one split sealing ring freely rotatable in said pair of sealing grooves adapted to seal against leakage from said connection channel along said slide-face.

GUSTAF ÖSTERGREN.

REFERENCES CITED

The following references are of record in the file of this patent:

UNITED STATES PATENTS

| Number | Name | Date |
|---|---|---|
| 1,323,320 | Jacobsen | Dec. 2, 1919 |
| 1,829,930 | Hele-Shaw et al. | Nov. 3, 1931 |
| 1,983,392 | Nilsson | Dec. 4, 1934 |